United States Patent [19]

Blanchard et al.

[11] Patent Number: 4,558,181

[45] Date of Patent: Dec. 10, 1985

[54] PORTABLE DEVICE FOR MONITORING LOCAL AREA

[75] Inventors: Kenneth E. Blanchard, Springfield; Stephen V. Sanislo, Jr., Drexel Hill, both of Pa.

[73] Assignee: Phonetics, Inc., Media, Pa.

[21] Appl. No.: 488,999

[22] Filed: Apr. 27, 1983

[51] Int. Cl.⁴ .......................................... H04M 11/04
[52] U.S. Cl. .................................................. 179/5 P
[58] Field of Search ................... 179/5 R, 5 P, 6.02, 179/90 BD, 2 A; 381/51, 56

[56] References Cited

U.S. PATENT DOCUMENTS

| | | | |
|---|---|---|---|
| 3,345,463 | 10/1967 | Hynes | 179/5 R |
| 3,505,476 | 4/1970 | Kelley, Jr. et al. | |
| 3,530,250 | 9/1970 | Schaum et al. | 179/2 A |
| 3,549,810 | 12/1970 | Driscoll | 179/5 R |
| 3,598,919 | 8/1971 | Lott | 179/5 P |
| 3,617,640 | 11/1971 | Cichanowicz | 179/5 P |
| 3,626,102 | 12/1971 | Cameron | 179/5 P |
| 3,647,974 | 3/1972 | Geisler | 179/5 R |
| 3,761,632 | 9/1973 | Colman | 179/5 P |
| 3,899,645 | 8/1975 | Brafman | 179/5 P X |
| 4,095,050 | 6/1978 | Beacham et al. | 179/2 A |
| 4,214,125 | 7/1980 | Mozer et al. | 381/51 |
| 4,232,195 | 11/1980 | Bartelink | 179/2 A |
| 4,241,237 | 12/1980 | Paraskevakos et al. | 179/5 R X |
| 4,284,849 | 8/1981 | Anderson et al. | 179/5 R |
| 4,371,751 | 2/1983 | Hilligoss, Jr. et al. | 179/5 R |
| 4,399,331 | 8/1983 | Brown et al. | 179/5 R |
| 4,427,974 | 1/1984 | Sheahan | 179/5 R X |
| 4,493,947 | 1/1985 | Loveless | 179/5 R X |
| 4,503,288 | 3/1985 | Kessler | 179/5 P X |

FOREIGN PATENT DOCUMENTS

| | | |
|---|---|---|
| 0037573 | 10/1981 | European Pat. Off. . |
| 51383 | 5/1982 | European Pat. Off. ............ 179/5 P |
| 3012122 | 10/1980 | Fed. Rep. of Germany . |
| 3119226 | 12/1982 | Fed. Rep. of Germany . |
| 53-63910 | 6/1978 | Japan ..................................... 381/56 |
| 1156543 | 6/1969 | United Kingdom ............... 179/2 A |
| 2005964A | 4/1979 | United Kingdom . |
| 2051520 | 1/1981 | United Kingdom ............... 179/5 R |
| 2105076A | 3/1983 | United Kingdom . |
| 2106354A | 4/1983 | United Kingdom . |

OTHER PUBLICATIONS

*Popular Science*, Jun. 1982, p. 1, "Zap Your Mom", (Advertisement by JS & A Products, Northbrook, Ill.).
Staffen et al., "Schalten per Telephone", Funkschau 24, 1982, pp. 55–57, (translation not available).
Wagner, "Telefon–Notruf–Computer", Funkschau 11, 1982, pp. 46–49.

*Primary Examiner*—Keith E. George
*Attorney, Agent, or Firm*—Body, Vickers & Daniels

[57] ABSTRACT

A portable, self-contained device for monitoring a selected local area for occurrence of any one of a plurality of preselected conditions, which device comprises a connector, connecting the device to local, standard telephone lines, a sound synthesizer containing selected sound, words and/or phrases at memory addressable locations capable of outputting a sound signal of message indicative of a selected combination of sounds, words and/or phrases, a successive dialing system for dialing successively a repeatable series of preselected telephone numbers in response to an occurrence of one of the monitored conditions, responsive answering to any one of the series of telephone numbers reached by the dialing system to cause the sound synthesizer to place a sound voice message on the telephone lines and dialing termination of the successive dialing system whereby the termination is responsive to a call back to the device. Further, the synthesizer is provided with TOUCH TONE signaling which can be amplified and used in dialing. The device includes a monitoring device having an alarm condition responsive to a non-connected sound alarm such as a smoke detector or burglar alarm, which alarm operates adjacent the monitoring device for preselected time duration indicative of an alarm condition. The device utilizes the alarm sound system as a local ambient sound detector which allows the sound to be applied to the telephone lines for monitoring or listening to sound at a local station from a remote station whether or not an alarm condition has occurred, but after selected time delay.

18 Claims, 17 Drawing Figures

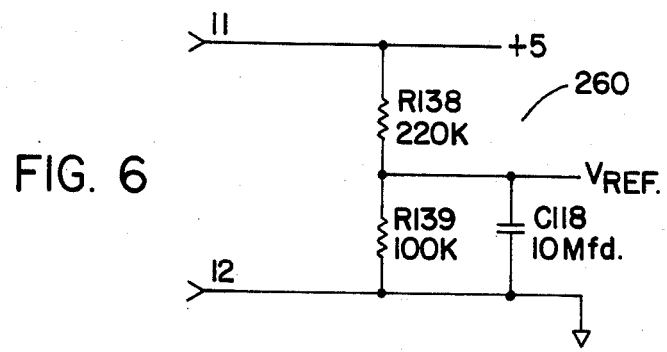
FIG. 6
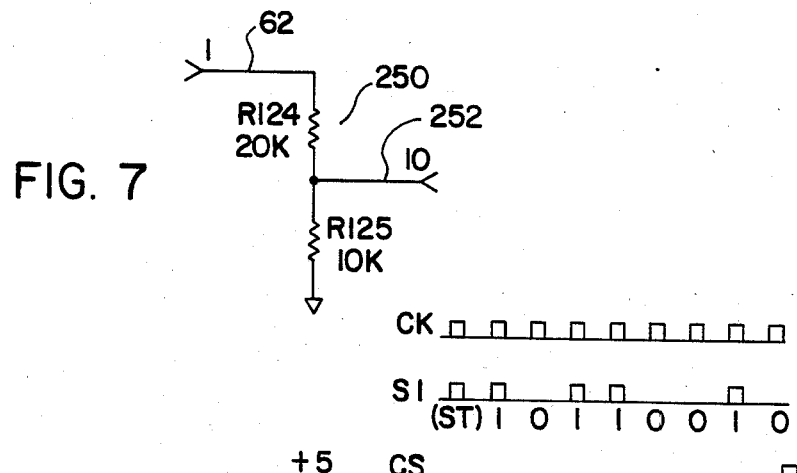
FIG. 7
FIG. 3E
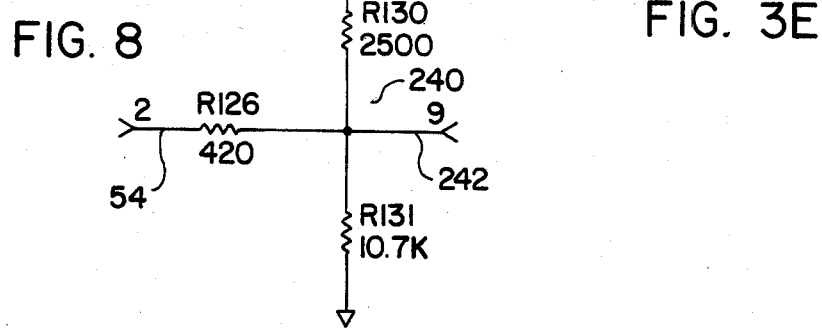
FIG. 8

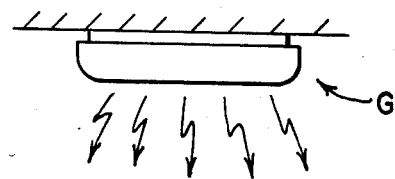
FIG. 13
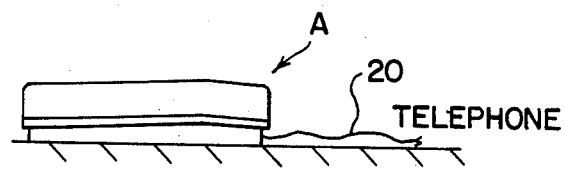
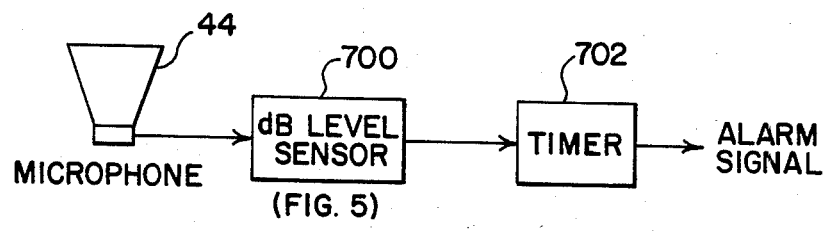

PORTABLE DEVICE FOR MONITORING LOCAL AREA

This invention relates to the art of portable devices for monitoring local areas and more particularly to a portable device which can be used domestically at any location having a standard telephone jack or terminal.

INCORPORATION BY REFERENCE

U.S. Pat. No. 4,214,125 relates to a sound synthesizer of the genral type employed in the present invention. This patent indicates the sampling techniques necessary to provide output sound indicative of words, sounds and/or phrases stored in digital form in an associatd ROM. In accordance with this technology, the ROM address creates sufficient digital information for a sound processor, such as a DT 3101 Digitalker manufactured by National Semi-Conductor Corporation. An industrial monitoring unit having features incorporated in the preferred embodiment, but not the inventive features defined in the claims is shown in U.S. Pat. No. 3,549,810. This patent together with U.S. Pat. Nos. 3,505,476; 3,617,640; and 4,241,237 are incorporated by reference herein as background information to illustrate the type of device to which the present invention is directed.

BACKGROUND OF INVENTION

From the several patents mentioned above, it is apparent that a tremendous amount of work has been devoted to a variety of monitoring arrangements utilizing telephone lines to detect alarm conditions and other conditions at local areas. Even though these systems can employ standard telephone lines, they have not been successful for monitoring domestic areas, such as homes, small businesses and boats or other recreational units. The reason for this complete failure to provide a monitoring system to be used in a domestic environment is that the systems heretofore contemplated involved complex monitoring arrangements, which required trained personnel with elaborate equipment to respond and oversee the total operation of the monitoring devices. If such devices were employed domestically, they would generally require supervision by a full time employee of a company hired to provide the supervision of the installed system even though telephone wires could be employed.

These previously available complex industrial type systems would not be accurately monitored by relatives and friends who were not trained to receive alarm messages and/or to operate the equipment. Since municipal police departments and fire departments will not monitor conditions in a locale by use of telephone calls to the various departments, the use of the complex systems heretofore available were generally of no value for domestic application by non-skilled persons in installing, setting up and responding to alarm conditions at remote areas.

THE INVENTION

The present invention relates to a portable monitoring device, which device is adapted for domestic use and which overcomes the complexity and general inapplicability of various complex systems previously designed for use on standard telephone lines. The present invention overcomes the difficulties of prior monitoring systems in that it allows a portable device to be used at any telephone location. This device can be supervised by relatives and friends in that the alarm conditions and all other information available to the monitored area can be transmitted to remote locations without complex tape recordings or other message generating means which can not contain a sufficient amount of information desirable for monitoring by non-trained personne at various locations.

A portable monitoring device of the type to which the present invention is directed is attached to any telephone jack. The standard telephone receiver set is then plugged into the monitoring device. After connection to an electrical outlet, the monitoring device is ready for operation by internal circuits which allow the monitored device to create complex messages and substantial monitored information, in an intelligible form, that can be interpreted by anyone of several untrained people at different, but selected, remote areas. Consequently, no supervisory personnel is required to interpret the alarm message from the device.

In accordance with an aspect of the present invention there is provided a portable self-contained device for monitoring a selected local area having a standard telephone terminal with standard external telephone lines for the occurrence of any one of a plurality of conditions adjacent the local area. As will appear later, these conditions can be high or low temperature, power interruption, operation of a smoke, fire or burglar alarm, existence of a high water level or entrance through a restricted area. Some of these conditions are single bit detections and others require magnitude comparison. In each situation, the alarm condition is ultimately recognized and causes the device to call several remote locations, in sequence.

In accordance with the general scheme of a portable device, it includes means for setting the device to an identification number corresponding to a telephone number at the local area. Thus, when a message is created by occurrence of an alarm condition, the message includes the local telephone number where the portable device is located. In accordance with this aspect of the invention, the portable device includes means for selectively connecting the device onto the standard external telephone lines installed at the selected local area, means for creating in the device a distinct signal upon occurrence of one of the plurality of preselected conditions, means for generating in the device a first synthesized voice message in response to the distinct signal, means for amplifying and playing this first synthesized voice message at the local area upon its creation and means for creating a first telephone format dialing signal corresponding to the identification number of a first, remote selected telephone on the lines in response to this distinct alarm signal. In this manner, the message is played at the local area for attention by a resident of the local area. If this resident does not take the necessary action to terminate the dialing, automatic dialing occurs to a first telephone identification number. This number is a standard number such as that of a friend or relative. The invention also includes cycling means for repeatedly creating this first dialing signal on the telephone lines at a time interval, including at least one pause period during which the device itself releases the telephone lines for call back signal indicative of an incoming call to the identification number of the portable device. In this manner, there is created a particular window or pause in a series of repetitive dialing functions so that call back can be received during the pause portion of the dialing cycle. In accordance with this aspect of the invention, there is means for creating an answer signal upon recognizing the occurrence of an answer at the first remote telephone, means for creating a second synthesized voice signal in response to the answer, switching means for directing the second synthesized voice signal as intelligence on the telephone lines, first terminating means for terminating operation of the dialing signal creating means in response to a call on the lines only during at least a pause and means for connecting a standard telephone set to the external lines of the device so that the set itself can be used in accordance with standard practice. A specific message is created when an answer is made. This message indicates the alarm condition and contains many standard items of information in a voice format. The message tells the person answering the call to call back to the local area during a preselected time window or pause. The device includes a termination means which recognizes a call back during the pause in the sequential dialing cycle. When a plurality of numbers are to be automatically dialed, in accordance with the invention, there is a pause after each of the particular numbers being dialed. During this pause, the portable system can receive a terminating call back signal. This is called a "call back" and must be specifically done by a person at one of the dialed telephones. The mere answering of the remote telephone and listening to the message created by the answering act is insufficient to terminate the dialing cycle. Thus, in accordance with this aspect of the invention, an intelligent act by someone at one of the called locations is required to terminate the out dialing to warn of an alarm or alert condition. By employing the concept of a distinct answer signal or message and a termination during a particular time window, inadvertent termination of the system is a remote possibility. In addition, complex circuitry heretofore used to identify a terminating signal is not required. By using a voice synthesizer, intelligent voice can be created without the use of tapes and other mechanisms which complicate the transmission of variable messages of the type to be recognized by an untrained person.

In accordance with another aspect of the present invention, there is provided a method for monitoring a selected local area having a standard telephone terminal with standard external telephone lines for the occurrence of any one of a plurality of selected conditions adjacent the local area. This method includes setting the device to an identification number corresponding to the telephone number at the local area, selectively connecting the device onto the standard telephone lines installed at the local area, creating a distinct signal upon occurrence of one of a plurality of selected conditions, generating in the device a first synthesized voice message in response to the distinct signal, amplifying and playing this first synthesized voice message at the local area upon its creation, creating a first telephone format dialing signal corresponding to the identification number of a first, remote preselected telephone on the line in response to the distinct alarm signal, repeatedly creating the first dialing signal on the lines at a time interval including at least one pause period during which the device releases the lines for a call back signal indicative of the incoming call to the identification number, creating an answer signal upon recognizing occurrence of an answer at the first remote telephone, creating a second synthesized voice signal in response to the answer signal, directing the second synthesized voice signal as intelligence on the telephone lines and terminating operation of the dialing signal creation means in response to a call on the lines during at least one of the pauses. This method provides the simple termination procedure of a call back during the pause. This feature of using a created time window requires an intelligent act by a person at a remote area to terminate the repeated or sequential dialing. The term "cycling" generally implies more than one telephone number is being called, in sequence. After each call, there is a pause. In practice, thirty seconds are allowed. This is sufficient time for the person at a remote location to hang up the telephone and then dial the identification number of the incoming message to terminate the repetitive or cycle dialing. Consequently, the mere act of answering a telephone at one of the remote locations does not terminate the cycle dialing and message creating function.

In accordance with another aspect of the present invention there is provided an analog to digital converter having an analog input, a digital output and means for converting an analog signal at the input to a proportional digital signal at the output and means for creating a detection of the distinct signal mentioned above when the output of the converter deviates from a selected value. By using this particular feature in the circuits of the portable monitoring device, transducers, such as thermometers and battery values, can be converted internally from an analog signal to a digital proportional signal for comparison and detection of an alarm condition. In accordance with this aspect of the invention, the converter is employed at the output of a multiplexer so that analog signal can be transmitted either to the telephone lines or processed into a digitized format for comparison with selected threshold values and creation of an appropriate distinct alarm signal. This feature is employed to create the alarm condition based upon a value, such as temperature or battery condition.

In accordance with another aspect of the invention, the alarm signal is created by the existence of a relatively high intensity sound for a preselected time. In accordance with another aspect of this part of the invention, this sound signal comes from a separate and distinct alarm device, such as a smoke alarm, fire alarm, or burglar alarm. Thus, when a standard smoke detector or alarm in an area being monitored is actuated, this fact will create an alarm condition in the portable device, even though the device is not physically connected to the alarm. To accomplish this, in accordance with one aspect of the invention, a high intensity sound detector with a preselected time setting is employed. If this intensity sound lasts beyond the selected time, an alarm condition exists in the portable device. The use of the portable device with a separate and distinct alarm system is of substantial advantage in a domestic environment in that the complexity of combining circuitry for various alarms with the monitoring system is avoided. This feature, taken together with the fact that the circuits and system employed in accordance with the invention can be used with a standard telephone set at a standard telephone jack, further exhibits the simplicity and advantage of the present invention over the devices incorporated by reference as background information.

In accordance with another aspect of the present invention, there is provided a circuit at the local area being monitored for creating a sound message on standard telephone wires or lines when an alarm condition exist at the local area and when a telephone at a remote location acknowledges a call on the line from a local area by answering a call from the local area. In other words, the circuit envisioned in this aspect of the invention allows an acknowledgment by answering of the telephone at the remote area and then a call back. In accordance with this aspect of the invention, the circuit includes means for automatically dialing the telephone at the remote location after an alarm condition exist, a sound synthesizer, having a controlling ROM for storing selected words and phrases at selected addresses, a microphone for receiving ambient sounds adjacent the circuit and means for selectively connecting the microphone or sound synthesizer to the telephone lines when the telephone at the remote location answers the call from the local area and means for causing the sound synthesizer to create selected messages when it is connected to the telephone line. In accordance with this aspect of the invention, the microphone associated with the circuit of the portable monitoring device can be used on the same telephone lines as the voice synthesizer, with only a simple switching arrangement. The selected, constructed message from the sound processor or voice synthesizer is controlled by directing addresses to the processor in accordance with standard practice. The simple switching means provides an arrangement for listening to the ambient conditions, as well as for hearing the constructed message created at the local area by the monitoring device upon answering of the telephone. The listening feature occurs after a time delay so that the answering person can be told that the microphone is to be attached. Also, listening can be done by a general call to the location which will provide a message of the local status and, then, allow listening for ambient noise. In accordance with the concept previously mentioned, the system is terminated by a call back during a pause after each dialing to a remote telephone; however, that is not a part of this particular aspect of the invention.

To accomplish the desired functions of providing a portable monitoring system for use domestically at locations having standard telephone lines, the present invention has a certain switching arrangement. To define this switching arrangement, the invention can be described as a portable, free standing device for monitoring one of several conditions at a local area having telephone lines, which device comprises a microphone for detecting ambient sounds and applying a sound signal in a first line, a voice or sound synthesizer for creating a voice emulating message in a second line, a speaker on the device, means for selectively connecting one of the first and second lines to a selector switching network in the device, this switching network has a first switch means for connecting the first line with the telephone lines, a second switch means for connecting the second line with the telephone lines and third switch means for connecting the second line to the device mounted speaker and means for selectively actuating the connecting means and the first, second and third switch means. In this manner, ambient sound and the synthesized message can be selectively attached or connected to the telephone lines. The synthesized message can also be connected to the speaker of the portable monitoring device so that the sound can be transmitted at the local area for hearing by any person present.

In accordance with another aspect of the present invention, the ROM used with the voice synthesizer or sound processor, in accordance with standard practice, includes stored data at selected locations which data corresponds to and reconstructs sounds corresponding to Touch Tone code numbers of the type used in telephone dialing. At no other time has Touch Tone been reconstructed by a sound processor or voice synthesizer for use in repetitive dialing of an alarm system of this type. Consequently, oscillators and other arrangements are not required in the device as was required when Touch Tone dialing was previously used in accordance with this aspect of the invention. By employing the voice synthesizer for both selectively created messages and Touch Tone dialing pulses, the mechanism within the portable device is substantially reduced. Of course, rotary type dialing devices could be employed in conjunction with the Touch Tone feature of the voice synthesizer, in situations where a particular telephone is not compatible with Touch Tone operation. Whe using touch tone constructed by the voice synthesizer or sound processor, it has been found that a 3:1 amplification is needed to assure that the amplification of the Touch Tone signals coming from the voice synthesizer or sound processor are sufficient to be detected within the telephone system.

In accordance with another aspect of the present invention there is provided, in the portable self-contained monitoring device, a circuit for detecting the non-existence of AC current, i.e. when the house current is off. This can be important to persons gone during the day when a freezer can be thawed before a long power failure is known. This circuit includes a battery driven crystal oscillator having a preselected frequency output pulse rate, means for decreasing the frequency to a pulsating clock of a preselected clocking frequency, means for counting the clocking pulses toward a preselected value, means for creating a train of control pulses by said AC house current and having a pulse rate controlled by house line frequency, means for creating an output signal when the preselected value of the counter is reached before a control pulse is created, means for resetting the clock counting means, means for counting the output signals from the counting means, the output counting signal includes means for creating a detect signal after a selected number of output signals, and means for resetting the preselected value to a number causing the output signal to occur at a rate matching the control pulse rate. By using this system, the AC pulses occur before the counter can time out, which occurs in a longer length of time, such as 9.0 ms. If the AC current is discontinued, the counter reaches its controlled count and recycles. If this has been done a selected number of times, such as two, it is known that there is no AC power. Thus, the monitoring system creates an alarm condition and also shifts the crystal control counter to 8.33 ms so that this crystal output can be used for timing functions, such as time keeping in the portable monitoring device.

The primary object of the present invention is the provision of a portable monitoring device for general use with standard telephone lines at an existing telephone terminal, which device contains features compatible with use in homes and other domestic environments, such as use of variable voice messages, inexpensive multi-purpose circuits, simple acknowledge sequencing, simplified processing procedures and usability by an unsuspecting, untrained person at a remote monitoring system.

Another object of the present invention is the provision of a portable monitoring device of the type defined above, which device requires no experience supervision, can be controlled by even casual attendance at remote telephones, is inexpensive, provides widely variable vocal messages and is assembled to a standard telephone set.

Yet another object of the present invention is the provision of a device, as defined above, which device is set into an alarm or alert, sequential dialing mode by either single bit alarm conditions or analog comparison type alarm conditions.

Still a further object of the present invention is the provision of a portable monitoring device of the type defined above, which device uses a unique "call back" to terminate the dialing sequence of the monitor only when it is received during a preselected time window or pause. This object minimizes inadvertent disconnection of the dialing device before a warning is acknowledged, without requiring complex protective equipment and disconnection techniques. An incoming call at any time other than a pause will be provided with a selected message, but will not disconnect an existing dialing sequence.

Yet another object of the present invention is the provision of a device, of the type defined above, which device uses a voice synthesizer or sound processor for construction of messages including both standard information and variable, selective information. Also the voice synthesizer or sound processor is used to create touch tone signals so that the synthesizer has a dual function in the portable monitoring device of the present invention.

Yet another object of the present invention is the provision of a monitoring device, as defined above, which monitoring device uses, as identification, the actual telephone number at which it is located so that a subsequent call back can be made by a person who hears the alarm message and also a telephone number to call, which call will be the call back signal previously discussed.

As a general object of the invention, there is provided a simplified monitoring system which can be placed in the location of a standard telephone, given that telephone number as its internal identification, identify certain alarm conditions, then call several numbers in sequence and will not terminate calling until a call back is received during a particular period of time. The provision of such a device allows it to be used domestically, without using trained supervision at remote locations which may be called when an alarm condition exist. This object, together with the use of the voice synthesizer or sound processor, allows normal talk to the remote telephones being called. This feature facilitates use of the device domestically. The voice synthesizer has a series of ROM locations with words and phrases which can be specifically addressed according to the given condition that exist at any given time so that a constructed message transmitted to an outside telephone is comprehensive, variable (according to the alarm) and understandable by the recipient, even though the recipient may have no knowledge that he or she is at a location which has been selected as an outgoing telephone for monitoring the device constructed in accordance with the invention.

These and other objects and advantages will become apparent from the following description taken together with the drawings which will be described in the next section.

BRIEF DESCRIPTION OF THE DRAWINGS

FIG. 3E is a pulse diagram showing operation pulses used by the sound processor or voice synthesizer;

FIGS. 6, 7 and 8 are further circuits contained in block HB of FIG. 3B for providing analog signals to be subsequently monitored for alarm conditions;

PREFERRED EMBODIMENT

Figure 1:
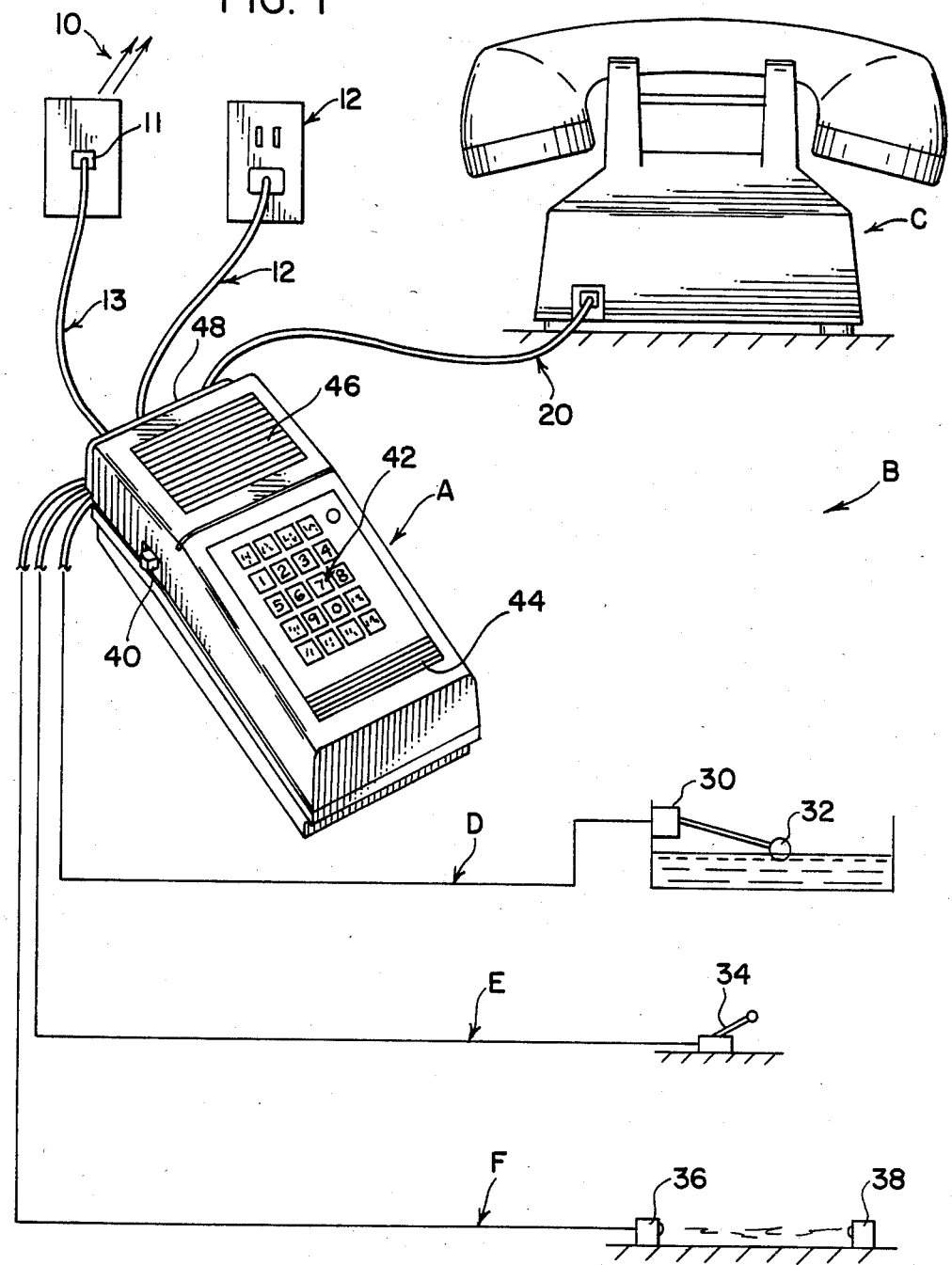
FIG. 1 is a schematic, partial diagram showing the preferred embodiment of the present invention as it is connected at the local area.
Figures 9, 10:
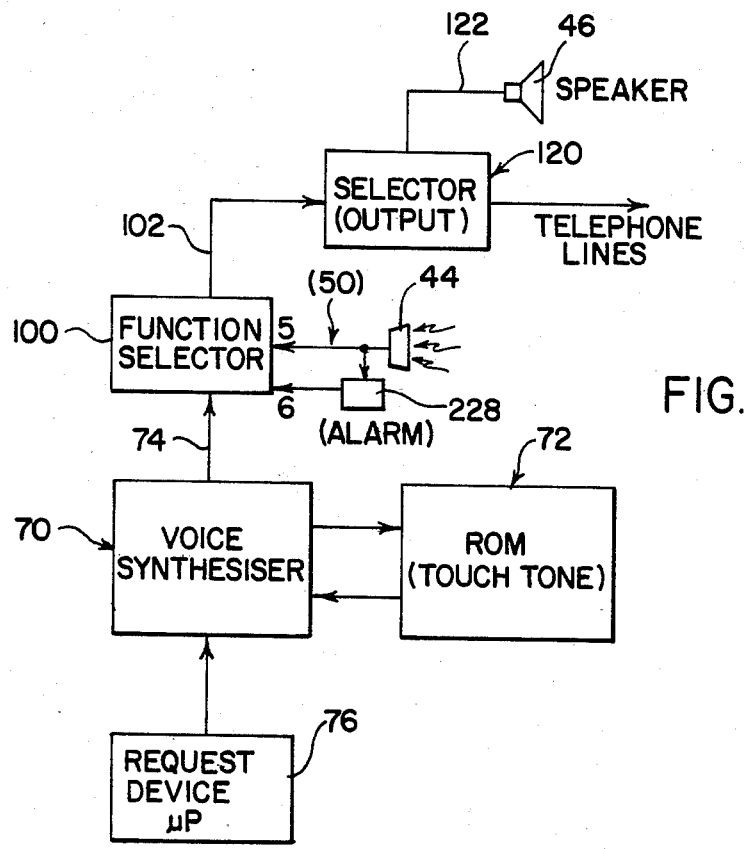
FIG. 9 is a schematic chart of the keyboard employed in the preferred embodiment of the present invention.
FIG. 10 is a block diagram of the selecting function between the input listening signal and the voice synthesizer.

Referring now to the drawings wherein the showings are for the purpose of illustrating a preferred embodiment of the invention only and not for the purpose of limiting same, FIG. 1 shows a portable, self-contained monitoring device A constructed in accordance with the present invention for monitoring local area B, such as a house, small office, boat, etc. This local area includes standard telephone lines 10 assigned an identification telephone number in accordance with standard practice. Jack 11 connects lines 10 through cord 13 to portable device A. The numeral 10 throughout the specification indicates outgoing and incoming telephone lines to the unit A. This is for simplicity in tracing the connections throughout the circuitry employed in the preferred embodiment of the invention. House current is provided at outlet 12 so that portable device A can be plugged into the house current for use of AC voltage in accordance with the description to follow. A standard telephone set C is connected through an intermediate cord 20 to portable monitoring device A to complete the installation. As can be seen, by simply connecting device A to jack 11 and telephone C to device A, the monitoring system is installed at the local area. This is essential for domestic application to the field to which the present invention is specifically adapted for use. When purchased, device A is programmed with the number corresponding with jack 11 and has internal information programmed in a manner to be explained later. Thereafter, the monitoring device operates in accordance with the introductory portion of the present application and allows monitoring of area B for several alarm conditions. External alarm conditions are indicated as single bit information inputs, such as alarm inputs D, E and F. In accordance with the illustrated embodiment, alarm input or condition D is connected to a water level microswitch 30 operated by a float 32. When the level of water, such as in the basement or in a boat, exceeds a given value, a logic 1 is applied to line D for processing in a manner to be described later. A single bit of information can be provided by feeler switch 34 for introducing an alarm input or condition in line E. In a like manner, a single bit alarm condition can be applied to line F by another detector, such as photodetectors 36, 38. The various external alarm conditions represented schematically by conditions D, E and F can be conditions selected by the person installing the alarm or monitoring device A. Indeed, these inputs are not necessary for operation of other aspects of the invention. The device is capable of receiving such inputs at input jacks. An on-off switch 40 switches the device to a standby condition when it is to be disconnected or otherwise incapacitated. In this condition, the internal battery will maintain some or all of the RAM logic. An appropriate keyboard 42, as shown best in FIGS. 3D and 9, is used to program the monitor; however, after programming the operation does not involve generally the use of the keyboard 42 except to interrogate the monitor regarding the RAM data and current conditions, such as time and temperature. Keyboard 42 is used for the purpose of identifying the local area, the ambient conditions or limits, the telephone numbers to be dialed out, the number of rings which will be allowed before activating the device. A person in area B may answer the telephone before the number of rings occur. If this does not occur, then device A automatically connects to lines 10 and gives current status and, after a time delay, connects the microphone to the lines for listening.

The present invention is a device which can be identified as a local telephone number, such as the number assigned by the telephone company to jack 11. Telephone numbers to be called by device A in case of an alarm or alert condition are programmed into the device by the pushbuttons of keyboard 42. Thereafter, the device operates as explained in the introductory portion of this application. Microphone 44 picks up ambient sound and is shown generally in FIGS. 2, 3C, 11 and 13. A speaker 46 allows an alarm or alert message to be broadcasted at local area B for the purpose of warning persons at the location of alarm conditions. This local broadcast and transmission on lines 10 is a dual function of the preferred embodiment of the present invention. Speaker 46 is also shown in FIGS. 2, 3C, 10 and 11. A temperature sensor housing 48 is molded as a part of the housing of device A. As so far explained, the monitoring system can be easily installed at a domestic telephone location and used for monitoring local area B for various alarm conditions. Single bit alarm conditions indicated by logic in lines D, E and F are augmented by analog alarm conditions, such as temperature from the device in housing 48 and the loss of power as sensed at outlet 12. In addition, sound can be detected by microphone phone 44 and, in certain conditions, cause an alarm condition, such as when smoke alarm G is activated. See the schematic representation in FIG. 13.

Detailed circuits employed in the preferred embodiment of the present invention are shown in FIGS. 3A-3D which are to be taken together as a single schematic layout of the circuitry. These detailed circuits employ hardwired accessories combined with a standard microprocessor P having internal RAM and ROM with eight data lines DB0-DB7. Sixteen address lines P10-P17 and P20-P27 can be used as input/output terminals for reading conditions and for directing appropriate pulses and other data to the various components forming the peripheral circuits in FIGS. 3A-3D. The remainder of the terminals on microprocessor P are terminals for an Intel 8050 microprocessor which is the microprocessor employed in the illustrated embodiment of the invention.

Figure 2:
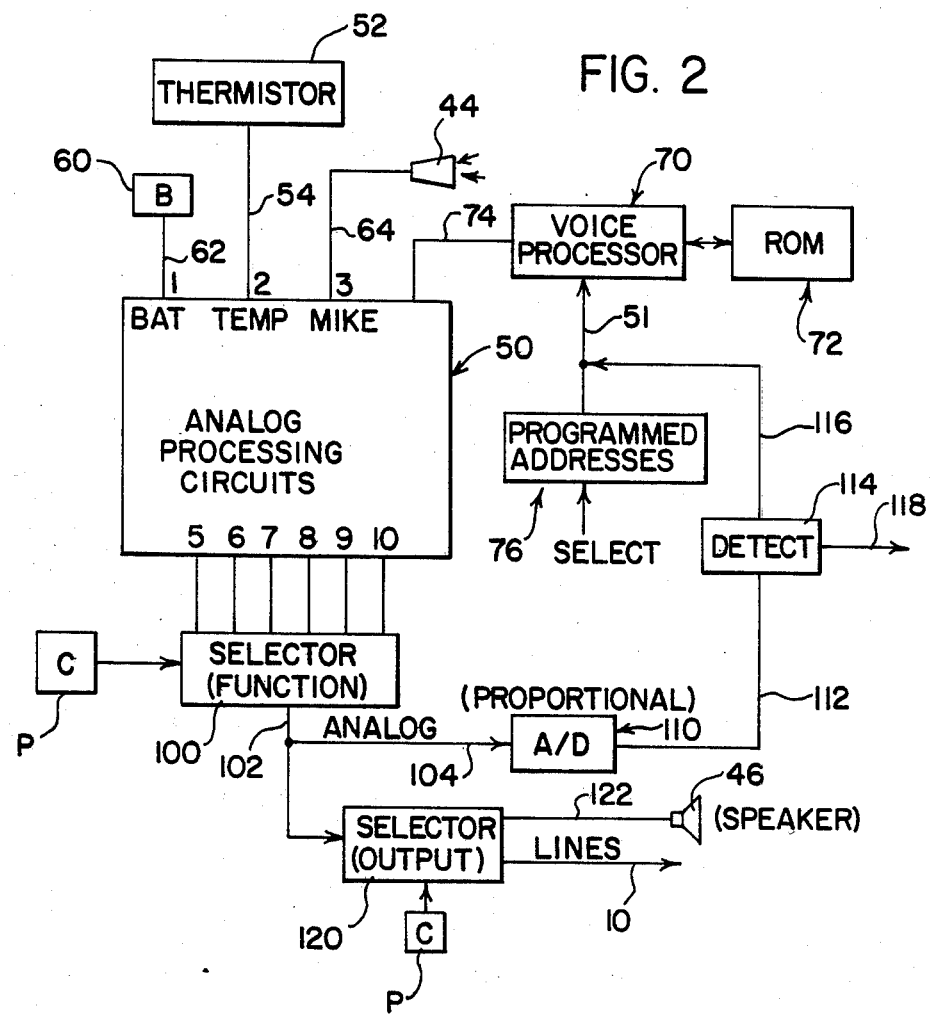
FIG. 2 is a block diagram of general circuits employed in the preferred embodiment of the present invention.
Figure 3A:
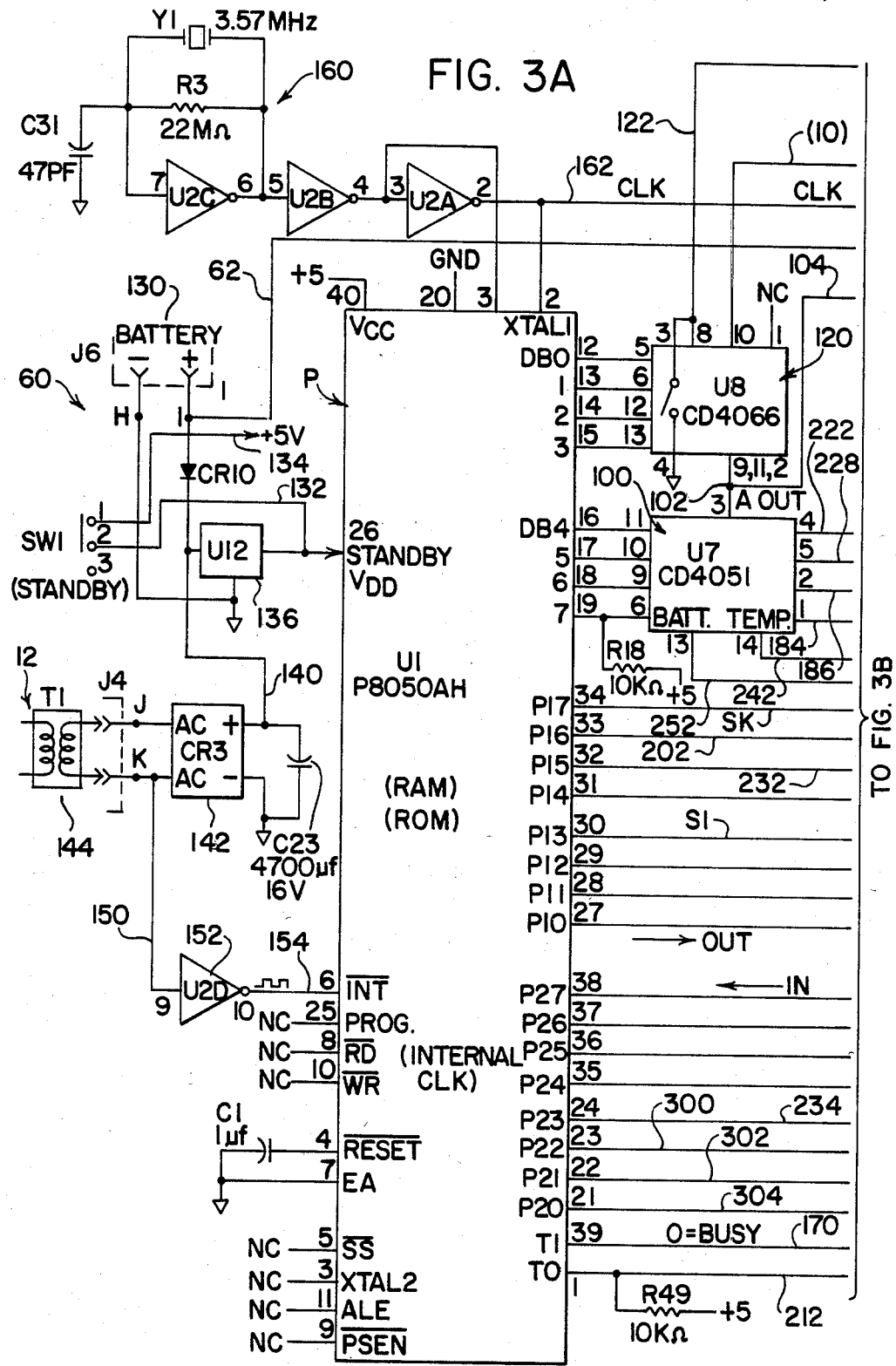
FIGS. 3A–3D are to be taken together and are the wiring diagram employed in the preferred embodiment of the present invention.
Figure 3B:
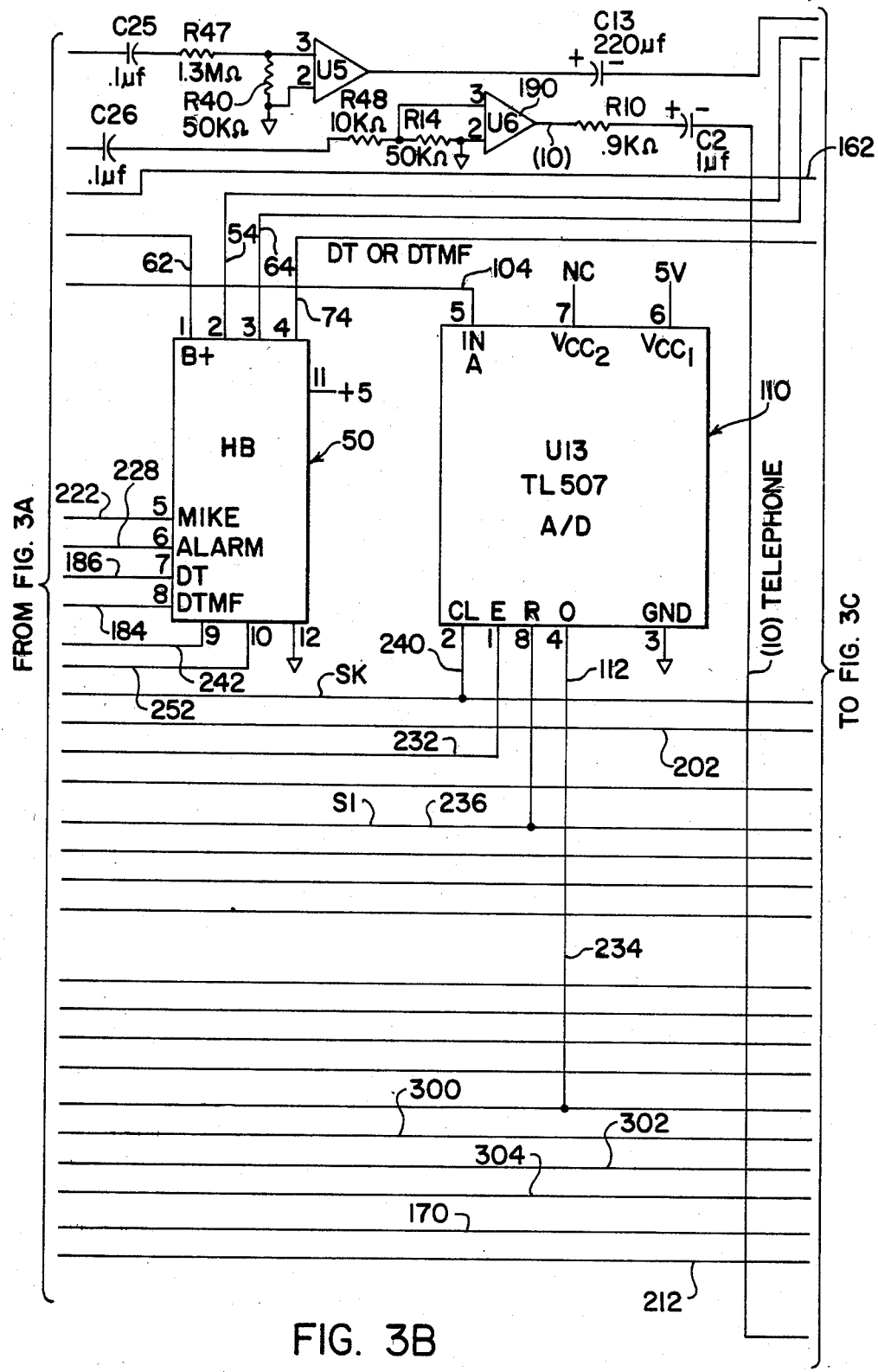
Figure 3C:
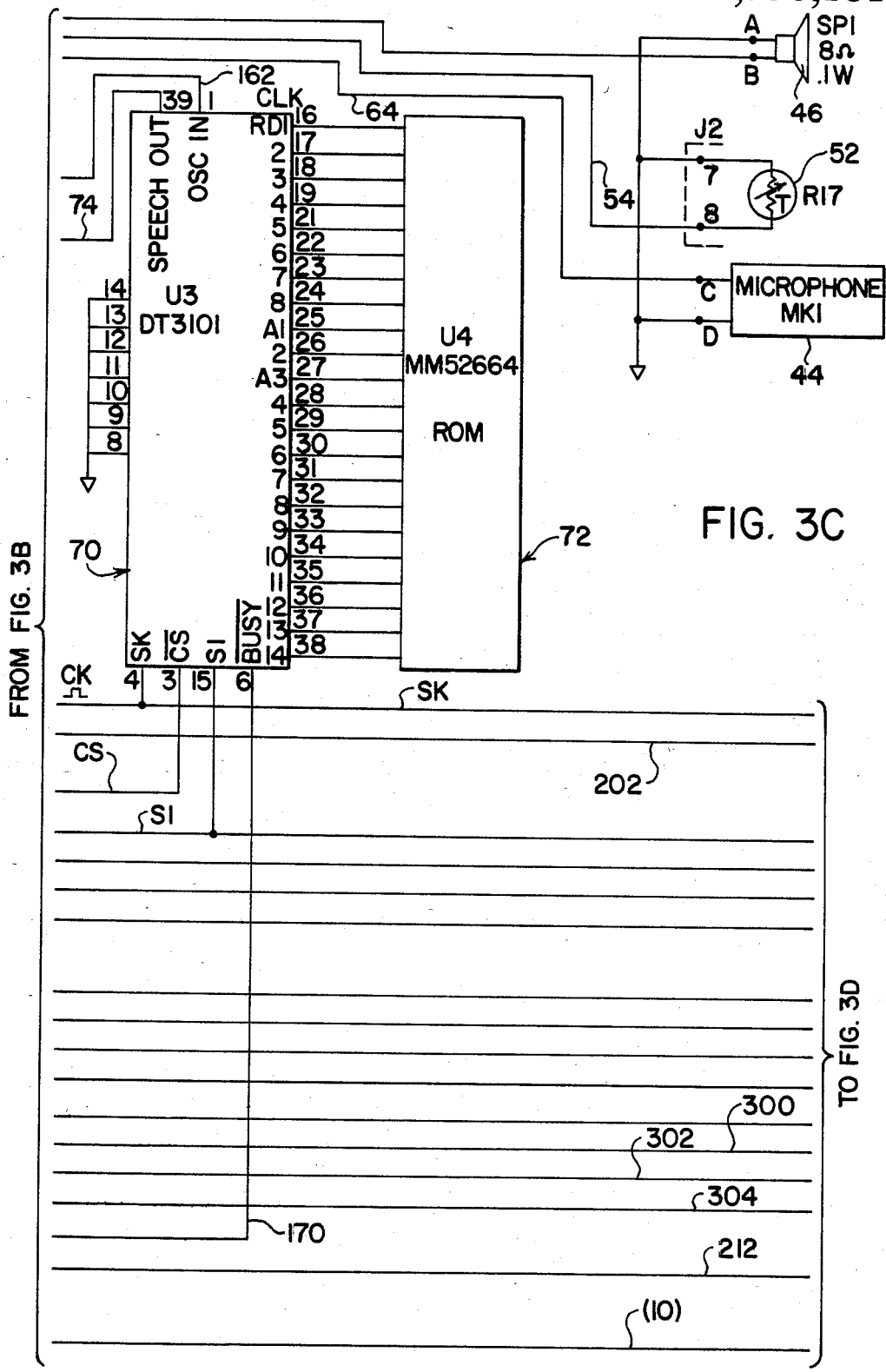
Figure 3D:
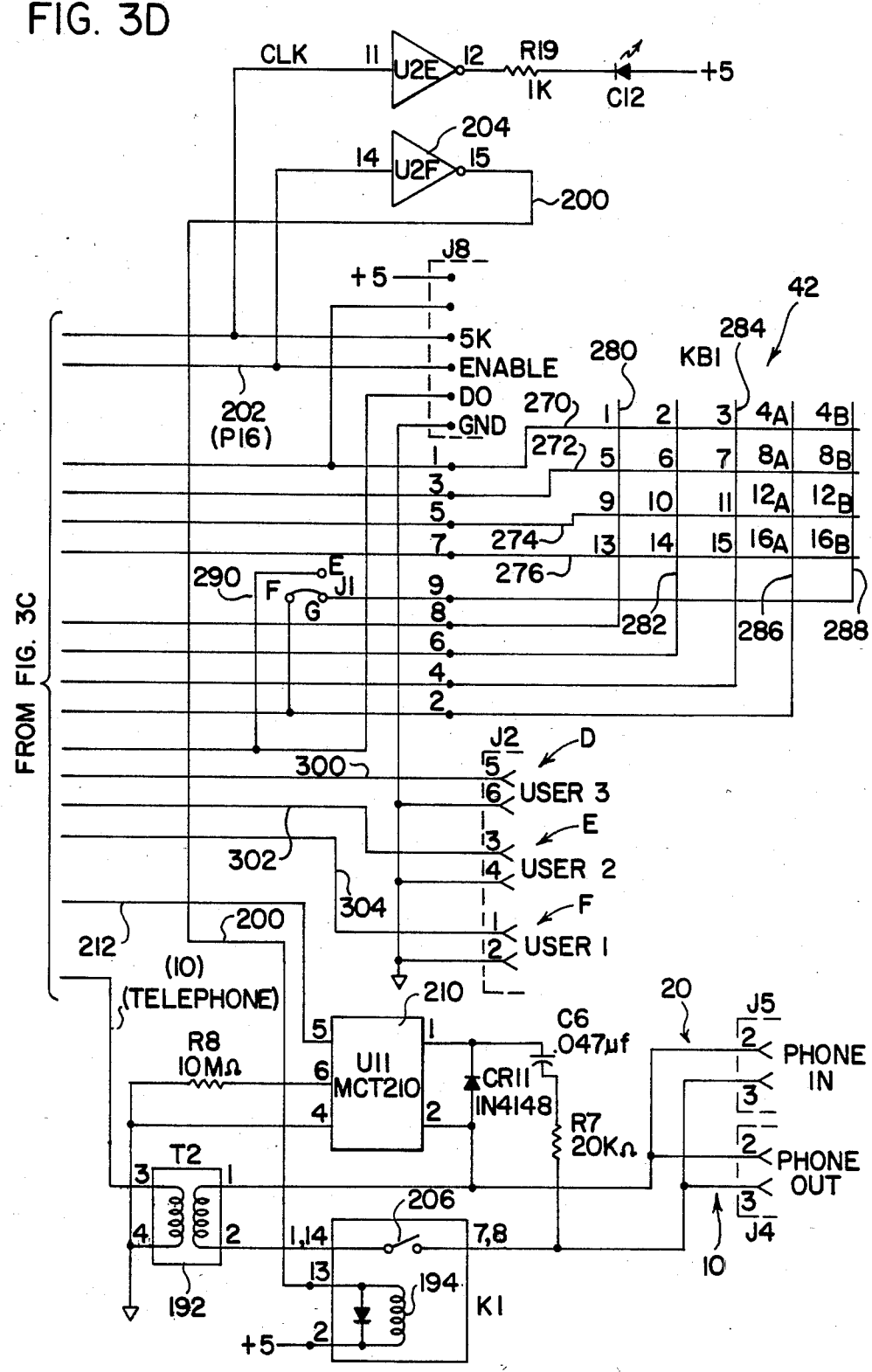
Figure 4:
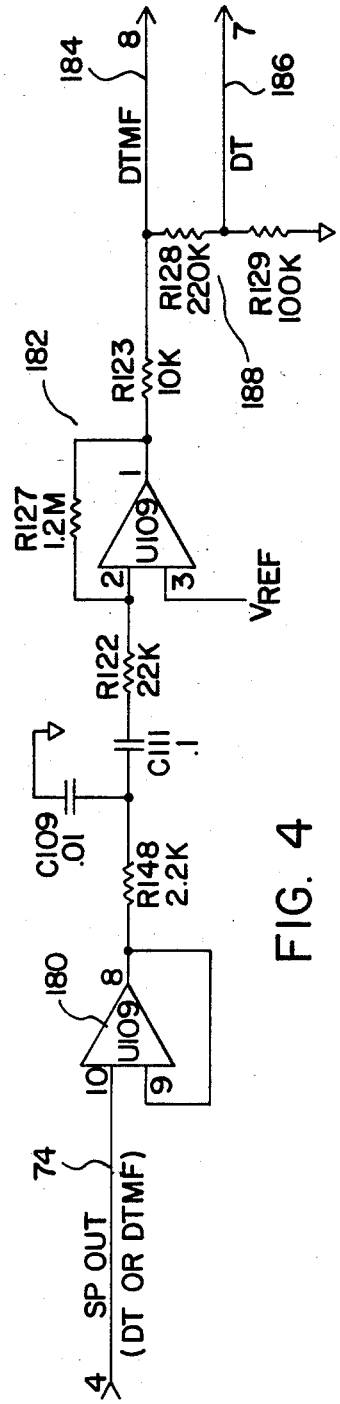
FIG. 4 is a circuit within the block HB of FIG. 3B for directing the output of the voice or sound processor to either terminal No. 7 or No. 8 for selection by the circuit shown in FIG. 3A.

FIGS. 2 and 10 are schematic representations of various components found in the detailed circuits of FIGS. 3A-3D and illustrate general operating features of these circuits. Analog processing circuits 50 is block HB as shown in FIG. 3B. This block contains several analog circuits, as shown in FIGS. 4-8, with inputs and/or outputs at terminal Nos. 1-12. These terminals correspond to the terminal numbers in FIGS. 4-8 for the internal circuits of analog processing circuits 50. Thermistor 52, as shown in FIG. 2 is the temperature sensing device in housing 48. The analog value of the analog temperature is directed to terminal No. 2 of circuits 50 through line 54. A battery monitoring input circuit 60, shown in FIG. 3A, has an input line 62 also connected to circuits 50, at terminal No. 1. Microphone 44, previously mentioned, is connected by line 64 with terminal No. 3 of circuits 50. In a like manner, voice processor or Digitalker DT 3101, as shown in FIG. 3C, has a ROM 72 for outputting voice messages on line 74 in accordance with standard voice synthesizer or sound processing practice. A representative voice synthesizer is described in U.S. Pat. No. 4,214,125, incorporated by reference herein. In FIG. 2, a word or message is requested through line S1 through which is serially loaded eight bit words indicative of the address from which various messages are to be outputted through line 74 to circuits 50. Some of the address words are standard eight bit words already programmed either in RAM or ROM of microprocessor P. These address words can be directed, as data, through line S1 by the schematically illustrated arrangement shown as box 76 in FIG. 2. Thus, by inputting the necessary data or words on line S1 a preselected message can be created in line 74 for outputting through the telephone lines or through speaker 46. Box or block 76 of FIG. 2 are the programmed words or sounds to be constructed as a message by voice processor or sound processor 70; however, other selected words may be individually requested for a given message. For instance, if the temperature is too high, the AC power is off, there is a sound alarm, or one of the alarm conditions D, E, F occur, a special input is directed to line S1 for a particular alarm or message. Thus, voice or sound processor 70 can create standard combinations of sounds to create repeated portions of the messages, such as the identification of the telephone calling, instructions regarding call back, etc. As an example, the message, "The temperature is _____" could be a standard address or group of addresses known to microprocessor P. The current temperature would need construction by words controlled by the actual digitized temperature. The standard phrases have addresses preprogrammed in the ROM of the microprocessor P in sequence. Also in the microprocessor are selected terms or messages which are called up only upon an alarm condition or for variable information. Variable information is formed by the address words outputted to voice or sound processor 70 from a detection device shown schematically as box 114 in FIG. 2. This will be explained somewhat later. Thus, standard words, standard messages, and selected messages can be combined as the total message applied at line 74 by voice processor 70 using the stored digital information at various locations in ROM 72 as illustrated by box 76. One standard message which is stored and outputted as a single message would be the surrounding words when processor 70 provides the identification number, the correct time in the monitor, the current temperature, that the electricity is on or not, if there have been no unusual sounds, there is no alert condition and that the battery is o.k. This is a standard type message which can be transmitted through line 74 when there is no alarm condition. A standard message after an alarm condition identifies the alarm and instructions on how to respond. A person of no skill at one of the dialed output telephones can call back during the pause to discontinue the cycling of the dialing system. This type of standard format message can be programmed in fixed memory. When there is a detect, the alert condition is provided in the message. In addition, current time, temperature, etc. can be variable information provided as words to processor 70.

The output terminals Nos. 5-10 of circuits 50 are connected to function selector circuit 100, which is a CD 4051 multiplexer, best shown in FIG. 3A. This function selector has an output 102 with an analog branch 104. Branch 104 is connected to the input terminal of an analog to digital converter 110, best shown in FIG. 3B. Output 112 of this converter (TL 507) is proportionate to the analog signal on input 110. Converter PL507 has a serial output proportional to the analog input in binary terms. This output is connected to detector 114 which is in software and selects a particular word from ROM 72. This is schematically represented as line 116 in FIG. 2. Details of the analog converter will be explained in more detail with respect to the specific wiring diagram in FIG. 3B.

Selector 120 has as an input output 102 of selector 100 and two outputs, telephone lines 10 and line 122, which is connected to speaker 46 on device A. An alarm message is broadcast locally before device A starts its dialing sequence.

Referring now generally to the block diagrams of FIGS. 2 and 10, they indicate that several alarm conditions can occur. If the alarm condition is a variation of an analog value it is passed through the analog to digital converter 110 and, if it exceeds a given level, there is a detect as indicated by block 114 of the flow diagram of FIG. 2. This event selects a unique portion of the voice processor for outputting through line 74. In addition, a flag or alarm condition is created as indicated by line 118. When an alarm condition occurs at one of the external conditions D, E and F or by analog conditions detected by flow chart block 114, device A shifts into an alarm mode.

One alarm condition, which is analog in nature, involves the microphone 44 as shown in FIG. 10. The circuits within the analog processing circuits 50 create an alarm signal in line 228 when a sound of a given value or allowed nature occurs for a preselected time. This is indicated as input No. 6 to the function selector 100 in FIG. 10. Various types of alarm conditions can be processed in accordance with the present circuitry, which circuitry is employed to perform the functions which will be set forth in more detail later in this description.

Referring again to FIG. 3A, the input circuit of these figures will be described in detail. Battery 130 is monitored by the value of the voltage on line 62. With switch SW1 in the normal position, line 132, which is the output of voltage level control device 136, is connected to 5.0 volt line 134. This controls the logic elements on the chips employed in the total circuitry. The output of level control device 136 provides a continuous standby voltage to microprocessor P. This voltage is held irrespective of the 5.0 volt logic voltage in line 134. If switch SW1 is shifted to the "standby" position between terminals (2,3), the standby voltage to the microprocessor is maintained although voltage to the various other components is not. Voltage level control device 136 has a second input 140 from rectifier 142 powered by transformer 144 from line voltage, schematically represented as AC power line 12. During normal operation the voltage output of device 136 is maintained by the AC voltage from transformer 144. Battery 130 will retain this output level when there is no AC power.

At the input of transformer 144, line 150 directs 60 Hertz voltage to inverter 152. This is a pulse forming inverter so that 60 cycle clocking pulses are created in line 154. This line is connected to the INTERRUPT terminal of microprocessor P to produce an internal clock. This clock is used for detecting power failures, for real time control of the microprocessor and for updating the time so that current time is stored in the RAM of microprocessor P for periodic retrieval and announcement at area B by voice or sound processor 70. Oscillator 160 is a battery controlled oscillator for creating a system clock in line 162. This system clock is used for outputting information from sound processor 70 in accordance with standard practice.

As previously indicated, voice processor 70 and ROM 72 as used in FIGS. 3A-3D are standard components and are operated in accordance with the pulse diagram shown in FIG. 3E. ROM 72 has all words, sounds, phrases and necessary digital information programmed into the various addressed locations by the manufacturer so that it can construct all statements hereinafter mentioned by a series of addresses appearing on line S1 (P13). These addresses are clocked in by an internal clock on line SK (P17), after processor 70 is enabled by a chip select signal in line CS (P14). The necessary Touch Tone sounds are programmed into ROM 72 which presents a novel situation wherein the output in line 74 can be a Touch Tone message for transmission through selectors 100, 102 to the telephone lines 10 for the purposes of successively dialing various telephones by Touch Tone procedure or format. Referring to FIG. 3E, a start pulse in line S1 is followed by an address in the form of a series of words indicative of the message to be outputted at any given time by the processor 70. The words are in 8 Bit form and serially loaded into processor 70. In accordance with standard practice, the voice signal or message is directed from the processor through line 74. While a message is being transmitted, a logic 0 appears in BUSY line 170 which holds Digitalker or sound processor 70 from receiving additional information. Logic 0 on BUSY line 170 indicates that the sound processor 70 is in the process of generating speech or other sound in line 74 for use by the system. Any additional information is stored in RAM at microprocessor P to await release of the BUSY line. Line 74 is connected to terminal No. 4 of circuits 50 which include an analog circuit shown in FIG. 4. In this circuit, buffer 180 is connected between line 74 and low pass filter 182 to produce two separate signals, one in line 184 and one in line 186. Both of these signals are directed from circuits 50 to function selector 100, as shown in FIG. 3A. Line 184 contains the Touch Tone output whereas the voice message is selected from output 186. Voltage divider 188 causes the output of the Touch Tone message, when selected by selector 100, to be at approximately three times the message volume or amplitude level. As previously mentioned, function selector 100 has an output 102 which directs the voice message from line 186 to either speaker 46 for broadcasting at local area B or to telephone lines 10 for transmission to a remote telephone location in response to an "answer" during the alert mode or a standard incoming call, after a set number of rings, when there is no alert being processed or after it has been acknowledged, as disclosed in FIG. 11. When using the telephone lines, appropriate filter and amplifier 190 is employed for the purpose of processing the message from voice or sound processor 70. Internal lines (10) are connected to the input of transformer 192 in the telephone processing circuit shown at the lower portion of FIG. 3D. This transformer is connectable to the incoming or outgoing telephone lines by relay 194 controlled by microprocessor P by the logic in line 200. This line is inverted logic from the ENABLE line 202 (P16) by action of the inverter 204. Thus, when the microprocessor P determines that telephone lines are to be connected to device A for an outgoing call or an incoming call, a logic 0 in line 200 closes switch 206. An incoming call from external lines 10 actuates optical detector 210 and applies a logic in line 212 (T0), which indicates that the telephone is ringing when at a logic 0. This is a flag input for the microprocessor so that the microprocessor can look at this particular terminal during each cycle of the Executive Program to determine whether or not there is an incoming call to telephone set C. If this flag occurs during the window period or pause in the cycle dialing, the cyclic dialing is terminated and the monitoring device A is shifted back into its quiescent condition awaiting additional alarm conditions. A logic 0 in line 212 at other times, allows device A, after a certain selected number of rings, to output the necessary message onto lines 10. The message states whether or not an alarm has been provided to a remote location or that no alarm condition exist or has been reported. As seen in FIG. 3D, device A is connected in parallel with telephone C so that it can operate in a normal manner. Switch 206 determines when the device is connected to outgoing lines 10.

Figure 5:
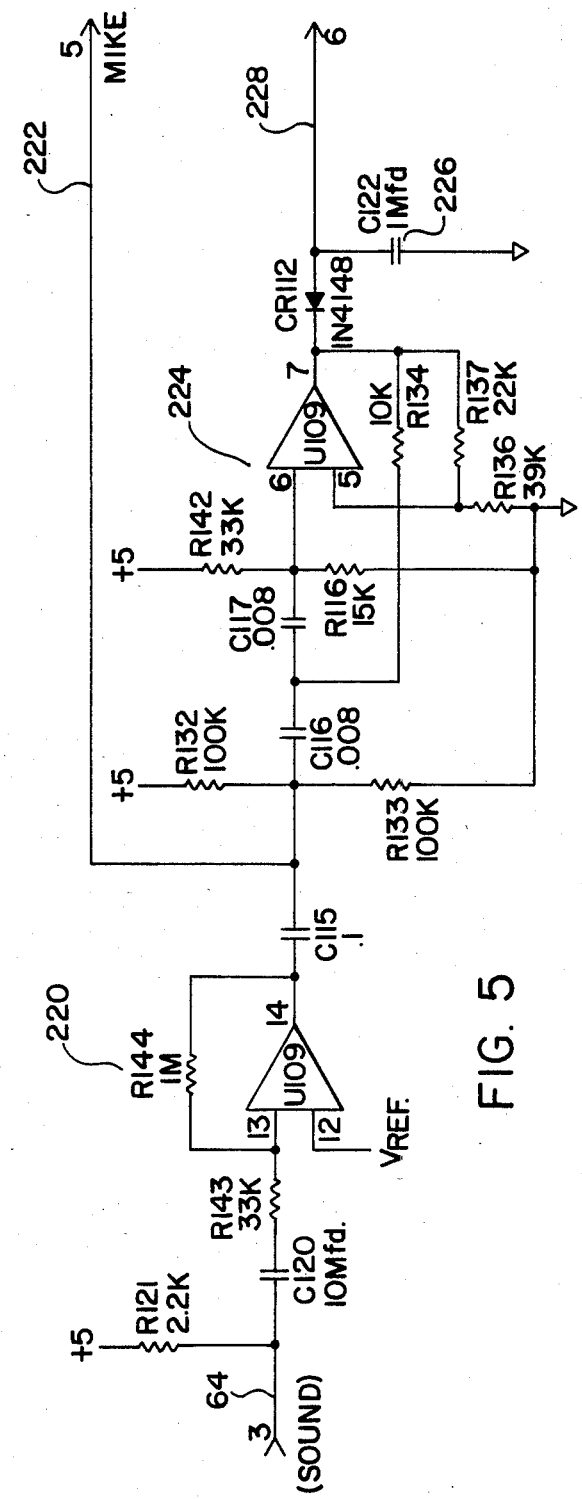
FIG. 5 is a circuit also in block HB of FIG. 3B for directing a sound signal to output terminal No. 5 of this block or for creating an alarm condition by the analog value of the voltage at terminal No. 6.

Referring now to microphone 44 in FIG. 3C, this microphone is connected to circuits 50 by line 64 which is processed in accordance with the circuit shown in FIG. 5. Amplifier 220 amplifies the microphone sound and applies it to output line 222. This can be directed through selector 100 to line 102. From there, selector 120 diverts it to telephone lines 10 as previously discussed. A high pass filter 224 is used to charge capacitor 226 which contains a charge representing the average level voltage detectable by the analog value on output line 228. This analog value is directed through selector 100 to branch or line 104. Thereafter, the analog value of the voltage on line 228 is periodically read by analog to digital converter 110. If this value exceeds a certain level, it is indicative of a detection or alarm condition represented by block 114 in FIG. 2. The existence of the alarm condition selects a particular word or phrase from voice processor 70, when the message is to be delivered. A flag indicating an alarm condition is created as represented by line 118, as shown in FIG. 2. The alarm flag, from the microphone, has been set, in the preferred embodiment, to a situation wherein the average voltage on capacitor 226 is exceeded by at least 40 mV for at least 5.0 seconds.

Referring now to the analog to digital converter 110, a standard TL507 is employed. By this system, a clock pulse in line 240, at the same time that line 232 is at a logic 1, enables the analog to digital converter. The converter than counts to the analog level and sends the digitized data from output line 112. A pulse in the S1 line, or line 236, resets the analog to digital converter for the next process cycle, in accordance with the Executive Program controlling microprocessor P.

To measure deviation of temperature by portable device A, analog to digital converter 110 is again used. In this instance, the detect concept is a threshold value below which, or above which, the temperature may drift. Either one of these thresholds indicates an alarm condition, either a "high" temperature or "low" temperature. Data is processed in accordance with the previously discussed operation of converter 110. Referring now to FIG. 8, analog information on line 54 relating to temperature is directed to a voltage divider 240 in the analog processing 50, represented by box HB in FIG. 3B. Output line 242 is directed through function selector 100 to output line 102. From there, branch or line 104 directs the analog information to the input of converter 110 for processing in accordance with procedures previously mentioned. The monitoring of battery 130 is also accomplished in the same manner by a circuit shown in FIG. 7. This circuit includes a voltage divider 250 and output line 252 which is directed to function selector 100 for subsequent processing by converter 110. If the voltage is too low, an alarm condition is detected and a flag is created as indicated by line 118 of FIG. 2. FIG. 6 shows a circuit within the HB block or circuits 50 and is a voltage control circuit 260 for controlling the reference voltage for various operational amplifiers used by the circuits in the analog processing circuits 50.

The wiring concept used in keyboard 42 is shown in FIG. 9 and FIG. 3D-276 and 280-288 overlap at the various pushbuttons. When a pushbutton is depressed, two of the lines are connected. This condition is read by microprocessor P for subsequent control of the memory stored information in the RAM formed as a part of the Intel 8050 microprocessor P. For example, when pushbutton No. 1 is depressed, line 270 is connected to line 280. This process allows the various incoming lines to be read by the microprocessor without outputting information on the lines as previously indicated. The pushbuttons of keyboard 42 are not generally employed for the basic alert or alarm mode of device A. They are used to program the memory locations of the RAM and for interrogating device A for stored data and current conditions, such as time and temperature. Jumper 290 allows the last row of pushbuttons to be read the same as the next to last row. If the keyboard were to be expanded the jumper would be shifted to the G/E position. Single bit logic from alarm conditions D, E and F are inputted on input lines 300, 302, 304, respectively. Single bit information on these lines is read by the microprocessor for the purpose of determining an alert condition based upon these particular alarms without passing through the analog to digital converter 110 as is the case with high sound, improper temperature, and house current failure. Thus, single bit alerts are possible by the present invention as well as analog comparison alerts. Each of these alerts causes the system A to go into the alert mode for continuous dialing. Device A remains in this mode until properly acknowledged and mode terminated in accordance with the flow diagram shown in FIG. 11. The symbols used on keyboard 42 are shown in FIG. 9 and will be explained later as they relate to programming the RAM of microprocessor P prior to initiating operation of device A at local area B and as they relate to interrogation of the RAM conditions. These functions are all performed in the Executive Program stored in ROM in accordance with standard data processing technology. The combined use of the hardwired circuits as used in the illustrated embodiment of the invention with the Executive Program performs the functions set forth in this disclosure.

PROGRAM OF RAM

When device A is installed as previously indicated at local area B, certain specific information is set into the RAM of microprocessor P in accordance with the scheme which will be set forth with respect to the keyboard shown in FIG. 9.

The SET button is pushed. Thereafter, phone number No. 1 button is pushed. The telephone number which is to be first dialed in case of an alarm is then entered by the number buttons. Thereafter, the ENTER button is pushed. This is then done for each of the first four different telephone numbers. In an alarm condition, each of the phone numbers is called by device A in sequence with a short pause inbetween dialing sequences. This feature, and the manner of acknowledgment, is set forth in the flow diagram of FIG. 11 which is part of the Executive Program.

The SET button is pushed and any of the remaining phone numbers (5-8) can be entered. These numbers relate to an additional feature of automatically dialing of these set numbers by depressing DIAL button and then the phone number button (1-8). This is somewhat standard dialing practice. As previously mentioned, the buttons of the keyboard are not needed for the alarm aspect of device A. The buttons are used after initial programming by the user for the limited purpose of automatically dialing all numbers (1-8) and for interrogating device A for determining information in the RAM.

After the telephone numbers have been set, the SET button is again pushed followed by the Id button. Thereafter, the local telephone number of area B is entered, in accordance with standard telephone format. This is the number which a person receiving a call during an alarm condition is told to call back. Consequently, this is the local telephone number at jack 11 shown in FIG. 1. After the local telephone number has been selected by the numbered pushbuttons, the ENTER button is pushed. To set the temperature alarm, the SET and then the TEMP buttons are pushed. When this has been done, sound Processor 70 says "Enter high temperature limit". Following this instruction, the high temperature is indicated by pushing the appropriate numbered button and then the ENTER button. After that has been done, the sound processor then says, "Enter low temperature". The low temperature is then entered in the same manner. This sets in the RAM the thresholds against which the analog temperature is periodically matched or compared to determine whether or not an alarm condition exist either "high" or "low". To set the internal time for device A, SET button is pushed, followed by the TIME button. This is then followed by the time in digital format followed by depression of the AM button. Then the ENTER button is pushed. If PM is to be entered, the PM button is depressed. This depresses the ENTER button at the same time. To set the number of rings, up to seventy-nine, which will occur before the device A will answer (close switch 206) and give current condition of the monitoring device, the SET button is pushed followed by the RINGS button. Thereafter the number (less than eighty) is entered for the number of rings so that an occupant of the area B can answer telephone C before automatic answering is accomplished by the monitoring device. Device A is now programmed and ready to function in accordance with the circuitry and functions so far described. The procedure or Executive Program is contained in the ROM of microprocessor P. Before going into the details of the program of the ROM used in the preferred embodiment, which program could be performed by hardwired, relay logic, the interrogation procedure for device A using keyboard 42 will be explained. The first button is "WHAT IS IT?". By pushing this button followed by any telephone number, the sound processor outputs, in voice format, the particular telephone number. By pushing the WHAT IS IT? button, together with the Id button, the local telephone number is given together with the entire system message including high temperature setting, low temperature setting and time. The WHAT IS IT? button, together with the RINGS button, indicate how many rings before an automatic answer when device A is not in the alarm mode and sequentially dialing. The WHAT IS IT? button, together with the TEMP button, give the current temperature. The WHAT IS IT? button, together with the TIME button, give the current time.

Dialing of the first four numbers in sequence occurs when there is an alarm condition as previously mentioned. The first number is dialed. If there is no call back within a preselected time window, the second number is dialed. If there is no call back during the next time window, the third number is dialed. This sequencing continues automatically dialing these four numbers in sequence until there is a call back. The Acknowledging format will be explained later with respect to FIG. 11. If there is an ANSWER at any dialed number, the alarm message is given with voice instructions on call back. This ANSWER does not stop the sequencing; however, the operation hesitates long enough for the message.

If the touch tone dialing inserted into ROM 72 of the sound processor are to be used, a special button is pushed before the number during the selection of the various telephone numbers to be used in automatic dialing and to be used in cyclic dialing for the purpose of identifying an alarm condition. Automatic dialing is accomplished by pushing the DIAL button together with the particular number to be called. The CLEAR button with the appropriate button is used to remove the telephone number, the Id number and the rings. Thereafter new values can be inserted. Pushing the CLEAR button together with the time button sets the time to 12 o'clock A.M. Of course, this is an optional feature and need not be employed in practicing the present invention. In practice, the CLEAR button will clear any function being performed by device A. If an alarm condition exists, the CLEAR button will terminate the call sequencing. Thus, when a person arrives home and the telephone is cycling in the alarm mode, the CLEAR button is pushed to reset the system.

ALARM CONDITION

Figure 11:
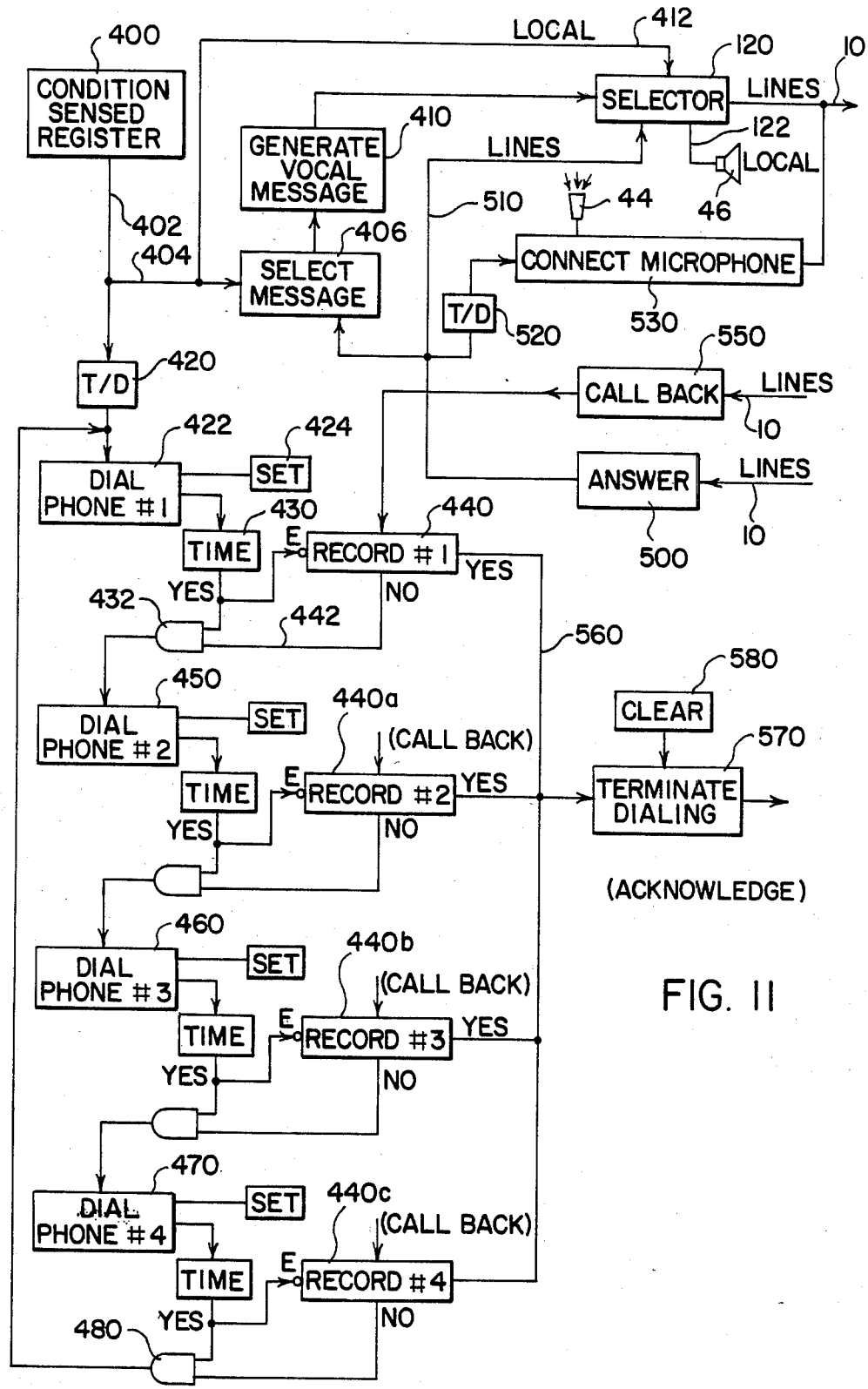
FIG. 11 is a flow chart of the acknowledgment feature employed in the preferred embodiment of the present invention.

The alarm mode of operation is set in ROM and contains certain preselected steps given in the above discussion and set forth partially in flow chart form in FIG. 11. These steps will be apparent from a representative alarm condition, such as "high temperature". When the high temperature occurs, the analog to digital converter 110 produces a value which is compared to the theshold value programmed in RAM. This produces or recognizes an alarm condition and places device A in its alarm or alert mode. This mode selects the words to be used as input words to the sound processor which are separate and distinct from standard words being controlled by the RAM individualized program and ROM fixed Executive Program of the microprocessor.

Upon the "high temperature" alarm condition, speaker 46 gives a message at least twice that there is a "high temperature" condition. Indeed, it may use the words "Attention, Attention". This is accompished by the programmed words being called up by the microprocessor and inputted to processor 70 for use through selector 120 to the speaker.

If there has been no depression of the CLEAR button, telephone No. 1 is called. If this telephone is answered, as indicated by the conditions of lines 10, the following message is conveyed:

(a) "This is telephone number (local number)"
(b) "The temperature is high"
(c) Repeat (a) and (b)
(d) "Again, Attention, Attention, . . ." then the total message is given to the answering person, the "high temperature" alert and all other instructions from the sound processor are provided as a message in voice format.
(e) Then the person is told to "listen" to the sound level for fifteen seconds.
(f) Device A connects the microphone 44 to the telephone lines for fifteen seconds.
(g) Then the person answering the telephone is told to . . . "indicate that you have received this warning message within thirty seconds by dialing . . .". The Id number is then given. As can be seen, most of this instruction message is standard and can be called by a single address to ROM 72. Only the "Id number" need to be specially constructed by LOOKING at the RAM location for the "Id" number.

If there is no "call back" in lines 10 within the thirty second window or pause, telephone No. 2 is then dialed. This procedure is repeated through the various telephones (1–4) until there is an "answer" followed by a "call back". If after the alarm condition has been reported and the system released by a call back, anyone who calls the telephone number for area A will receive a message indicating what telephone number received and acknowledged the alarm or warning condition. Thus, the actual telephone number giving the "call back" during the thirty second pause is stored in RAM. If the owner calls in to the device, this stored information is available.

During a call in when there has been no alarm condition, the device A provides the following message:

(a) The identification number.
(b) The correct time.
(c) The current temperature.
(d) That the electric is ON.
(e) That there has been no unusual sounds
(f) That alert conditions (e) and (f) are o.k.
(g) Battery condition is o.k.

The device then connects the caller to microphone 44 so that the caller can listen to sounds occurring in the unattended location.

As an added option, a program can be provided so that the time or temperature button can be pushed and the sound processor gives the current time and current temperature, respectively.

Referring now to FIG. 11, flow chart for acknowledgment of an alarm condition is illustrated. When an alarm condition exist, box 400 provides a signal in line 402. Line 404 selects the message to be generated based upon the alarm condition, as represented by box 406. The vocal message is then created indicated by box 410 and is directed to selector 120. The selector is originally shifted to the local condition by line 412. This transmits the message to line 122 for local broadcast through speaker 46. After a sufficient time delay, represented by box 420, cyclic dialing occurs. Telephone No. 1 is first dialed indicated by box 422. The number is the number set as indicated by box 424. There is then a time delay represented by box 430. When this time delay expires, which is the window or pause, gate 432 is activated. Also, the "call back" record 440 is enabled. If there is no call back, then a NO remains in line 442. Thus, gate 432 is energized if there is no call back during the thirty second pause during which record 440 is enabled. This starts the dialing sequence at the second phone number represented by box 450. This same procedure progresses through telephone No. 3, represented by box 460, and telephone No. 4, represented by box 470. If there is no "call back" during the time when the recorders 440, 440a, 440b or 440c have been activated. Gate 480 recycles the dialing until a CLEAR button is pushed or a "call back" is received during the thirty second pause between telephone dialings. An "answer" is indicated by box 500. This will immediately select the message, as indicated by box 406, and connect the generated message to lines 10 through line 510 for controlling selector 120. After a time delay indicated by box 520, microphone 44 is connected to lines 10, as indicated by box 530. A "call back" on lines 10, is represented by box 550. If this occurs, during a time window, as represented by boxes 440, 440a, 440b and 440c, line 560 is energized to terminate dialing, as indicated by box 570. Termination is also accomplished by pushing the CLEAR button, as indicated by box 580.

By providing the termination of dialing only during certain "call back" pauses, a non-trained person can operate the monitoring device A. There is no training required and the message informs the answering person exactly what to do during the thirty second call back pause. This assures that someone of a minimum judgment receives the message. The telephone number that answered and received the alert message is recorded in RAM for subsequent interrogation, as previously mentioned.

Figure 12:
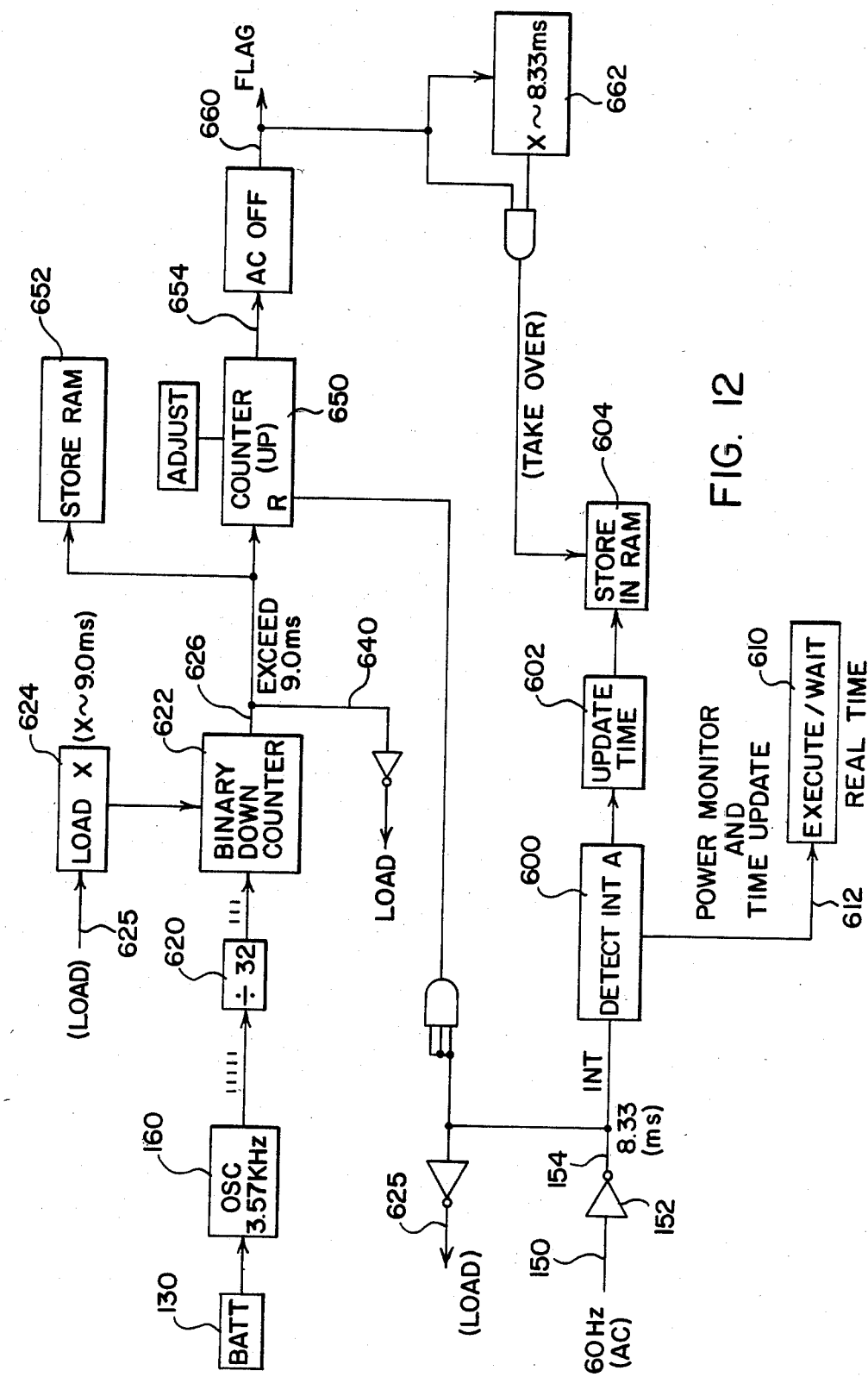
FIG. 12 is a block diagram of the power monitoring, real time and clock circuits employed in the preferred embodiment of the present invention; and, FIG. 13 is a schematic, side elevational and block diagram view of one aspect of the present invention.

Referring now to FIG. 12, a system for maintaining the internal clock, establishing Real Time and monitoring existence of house current at outlet 12 is schematically represented. A pulse in line 154 to the INTERRUPT terminal of microprocessor P occurs each 8.33 ms. This INTERRUPT condition is detected by flow chart box 600 and updates the stored current time, as indicated by flow chart box 602. This time is stored in RAM as indicated in box 604. Thus, the current time is continuously updated and stored in RAM for pushbutton interrogation. In addition, the Executive Program stored in the ROM of microprocessor P is processed and waits as indicated by flow chart box 610. Upon receipt of an INTERRUPT signal indicated by line 612, the Executive Program continues until completed. It then WAITS until the next clock pulse at the INTERRUPT terminal INT. In this manner, the Real Time of microprocessor P is controlled.

The monitoring aspect of the circuit shown in FIG. 12 is controlled by the output of oscillator 160. This oscillator has an output of 3.57 MHz which is divided by 32, as indicated by box 620. This reduced rate pulse train is used to downcount counter 622 from a value X to zero. This is indicated by the LOAD function box 624 controlled by line 625. A pulse in line 625 or a YES in this line indicates that counter 622 is loaded with the value X. This value is generally 9.0 ms, or at least substantially greater than 8.33 ms. If counter 622 counts out, there is a YES indication in line 626. At each INTERRUPT pulse in line 154 the number X is loaded into counter 622. Under normal circumstances there is no signal in line 626 because the counter is reset and loaded before the counter can downcount from the X number. This is normal operation of the monitoring system and indicates that there is a 60 cycle house current. If this house current is interrupted, there will be no LOAD pulse in line 625. Thus, after 9.0 ms, a pulse or a YES condition occurs in line 626. This LOADS counter 622 through line 640 for the next down count cycle. Pulses in line 626 are counted by counter 650 and are stored in appropriate RAM location represented by box 652. When counter 650 reaches a desired number, such as (2) a YES condition occurs in line 654. This activates flag 660 indicating that there is an alarm condition which alarm condition is a power failure. Also, value of X is converted a number corresponding with 8.33 ms, as indicated by block or box 662 of the flow diagram. Thus, a pulse occurs in line 654 each 8.33 ms. This pulse takes over the operation of the internal time storing function indicated by box 604. Thus, stored time is controlled by the battery, even without AC power by a mechanism which can also determine and detect the nonexistence of house current.

Referring now to FIG. 13. As has been indicated before, device A can be used to detect a non-attached alarm system, such as a smoke detector G. This is accomplished by microphone 44 which has some type of level sensor 700 and a timer 702 for obtaining an alarm signal. These particular functions are performed by the circuitry indicated in FIG. 5 together with the threshold programmed into the ROM of microprocessor P.

As can be seen, the RAM portion of microprocessor P is used for the changeable information and the rest of the information and Executive Program, to accomplish the present invention, is preprogrammed by the manufacturer in the ROM portion of the microprocessor. ROM 72 of processor 70 is also programmed by the manufacturer to produce the messages used in the invention by standard technology, except for the programming of the touch tone pulses at selected addresses.

Having thus described the invention, the following is claimed:

1. A portable, self-contained device for monitoring a selected local area, having a standard telephone terminal with standard external telephone lines for occurrence of any one of a plurality of preselected conditions adjacent said local area, said device comprising:
   (a) means for setting in said device a first identification number corresponding to a telephone number for the external lines into said selected local area;
   (b) means for selectively connecting said device onto said standard external telephone lines installed at said selected local area;
   (c) means for creating in said device a distinct signal upon occurrence of one of said plurality of preselected conditions;
   (d) means for generating in said device a first synthesized voice message in response to said distinct signal;
   (e) means for amplifying and playing said first synthesized voice message at local area upon its creation;
   (f) means for creating a first telephone format dialing signal corresponding to a second identification number of a first, remote preselected telephone on said lines in response to said distinct signal;
   (g) cycling means for repeatedly creating said first dialing signal on said lines at a time interval including at least one pause period during which said device releases said lines for a call back signal indicative of an incoming call to said first indentification number;
   (h) means for creating an answer signal upon recognizing the occurrence of an answer at said first remote telephone;
   (i) means for creating a second synthesized voice signal in response to an answer signal wherein said second synthesized voice signal includes a representation of said first identification number;
   (j) switch means for directing said second synthesized voice signal as intelligence to said lines;
   (k) first termination means for terminating operation of said dialing signal creating means in response to a call on said lines only during said at least one pause; and,
   (l) means for connecting a standard telephone set to said external lines through said device.

2. A device as defined in claim 1 including means for creating a second telephone format dialing signal corresponding to the identification number of a second, remote preselected telephone on said lines during said time interval and means for creating one of said pauses after said first dialing signal and another of said pauses after said second dialing signal.

3. A device as defined in claim 1, wherein said dialing signal is TOUCH TONE coded and including a voice synthesizer for generating said first and second voice messages, and including means for causing said synthesizer to create said dialing signal.

4. A method for monitoring a selected local area with a device having a standard telephone terminal with standard external telephone lines, for occurrence of any one of a plurality of preselected conditions adjacent said local area, said method comprising:
   (a) setting a first identification number in said device corresponding to a telephone number for the external lines into said selected local area;
   (b) selectively connecting said device onto said standard external telephone lines installed at said selected local area;
   (c) creating a distinct signal upon occurrence of one of said plurality of preselected conditions;
   (d) generating in said device a first syhthesized voice message in response to said distinct signal;

(e) amplifying and playing said first synthesized voice message at said local area upon its creation;

(f) creating a first telephone format dialing signal corresponding to a second identification number of a first, remote preselected telephone on said lines in response to said distinct signal;

(g) repeatedly creating said first dialing signal on said lines at a time interval including at least one pause period during which said device releases said lines for a call back signal indicative of an incoming call to said first identification number;

(h) creating an answer signal upon recognizing the occurrence of an answer at said first remote telephone;

(i) creating a second synthesized voice signal in response to an answer signal wherein said second synthesized voice signal includes a representation of said first identification number;

(j) directing said second synthesized voice signal as intelligence to said lines; and, (k) terminating operation of said dialing signal creating means in response to a call on said lines during said at least one pause.

5. A portable, self-contained device for monitoring a selected local area, having a standard telephone terminal with standard external telephone lines for occurrence of any one of a plurality of preselected conditions adjacent said local area, said device comprising:

(a) means for setting a first identification number in said device corresponding to a telephone number for the external lines into said selected local area;

(b) means for selectively connecting said device onto said standard external telephone lines installed at said selected local area;

(c) means for creating in said device a distinct signal upon occurrence on one of said plurality of preselected conditions;

(d) means for generating in said device a first synthesized voice message in response to said distinct signal;

(e) means for creating a first telephone format dialing signal corresponding to a second identification number of a first, remote preselected telephone on said lines in response to said distinct signal;

(f) cycling means for repeatedly creating said first dialing signal on said lines at a time interval including at least one pause period during which said device releases said lines for a call back signal indicative of an incoming call to said first identification number;

(g) means for creating an answer signal upon recognizing the occurrence of an answer at said first remote telephone;

(h) means for creating a second synthesized voice signal in response to an answer signal wherein said second synthesized voice signal includes a representation of said first identification number;

(i) switch means for directing said second synthesized voice signal as intelligence to said lines;

(j) first termination means for terminating operation of said dialing signal creating means in response to a call on said lines only during said at least one pause;

(k) an analog to digital converter having an analog input, a digital output and means for converting an analog signal at said input to a proportional digital signal at said output; and, (l) means for creating said distinct signal when said output deviates from a selected value.

6. A portable, self-contained device for monitoring a selected local area, having a standard telephone terminal with standard external telephone lines for occurrence of any one of a plurality of preselected conditions adjacent said local area, said device comprising:

(a) means for setting in said device a first identification number corresponding to a telephone number for the external lines into said selected local area;

(b) means for selectively connecting said device onto said standard external telephone lines installed at said selected local area;

(c) alarm means for creating in said device a distinct alarm signal upon occurrence of one of said plurality of preselected conditions;

(d) means for generating in said device a first synthesized voice message in response to said distinct alarm signal;

(e) means for creating a first telephone format dialing signal corresponding to a second identification number of a first, remote preselected telephone on said lines in response to said distinct signal;

(f) cycling means for repeatedly creating said first dialing signal on said lines at a time interval including at least one pause period during which said device releases said lines for a call back signal indicative of an incoming call to said identification number;

(g) means for creating an answer signal upon recognizing the occurrence of an answer at said first remote telephone during one of said pauses;

(h) means for creating a second synthesized voice signal in response to an answer signal wherein said second synthesized voice signal includes a representation of said first identification number;

(i) switch means for directing said second synthesized voice signal as intelligence to said lines;

(j) first termination means for terminating operation of said dialing signal creating means in response to a call on said lines only during said at least one pause; and, (k) said alarm means including means for creating an alarm signal when a sound of given intensity continues for a preselected time.

7. A portable, self-contained device for monitoring a selected local area, having a standard telephone terminal with standard external telephone lines for occurrence of any one of a plurality of preselected conditions adjacent said local area, said device comprising:

(a) means for setting in said device a first identification number corresponding to a telephone number for the external lines into said selected local area;

(b) means for selectively connecting said device onto said standard external telephone lines installed at said selected local area;

(c) alarm means for creating in said device a distinct alarm signal upon occurrence of one of said plurality of preselected conditions:

(d) means for generating in said device a first synthesized voice message in response to said distinct alarm signal;

(e) means for creating a first telephone format dialing signal corresponding to a second identification number of a first, remote preselected telephone on said lines in response to said distinct signal;

(f) cycling means for repeatedly creating said first dialing signal on said lines at a time interval including at least one pause period during which said device releases said lines for a call back signal indicative of an incoming call to said first identification number;

(g) means for creating an answer signal upon recognizing the occurrence of an answer at said first remote telephone during one of said pauses;

(h) means for creating a second synthesized voice signal in response to an answer signal wherein said second synthesized voice signal includes a representation of said first identification number;

(i) switch means for directing said second synthesized voice signal as intelligence to said lines;

(j) first termination means for terminating operation of said dialing signal creating means in response to a call on said lines only during said at least one pause; and, (k) said alarm means including means for creating an alarm signal when a digitized representation of an ambient condition deviates from a preselected condition.

8. A portable, self-contained device for monitoring a selected local area, having a standard telephone terminal with standard external telephone lines for occurrence of any one of a plurality of preselected conditions adjacent said local area, said device comprising:

(a) means for setting in said device a first identification number corresponding to a telephone number for the external lines into said selected local area;

(b) means for selectively connecting said device onto said standard external telephone lines installed at said selected local area;

(c) alarm means for creating in said device a distinct alarm signal upon occurrence of one of said plurality of preselected conditions;

(d) means for generating in said device a first synthesized voice message in response to said distinct alarm signal;

(e) means for creating a first telephone format dialing signal a second identification number of a first, remote preselected telephone on said lines in response to said distinct signal;

(f) cycling means for repeatedly creating said first dialing signal on said lines at a time interval including at least one pause period during which said device releases said lines for a call back signal indicative of an incoming call to said first identification number;

(g) means for creating an answer signal upon recognizing the occurrence of an answer at said first remote telephone during one of said pauses;

(h) means for creating a second synthesized voice signal in response to an answer signal wherein said second synthesized voice signal includes a representation of said first identification number;

(i) switch means for directing said second synthesized voice signal as intelligence to said lines;

(j) first termination means for terminating operation of said dialing signal creating means in response to a call on said lines only during said at least one pause; and, (k) said alarm means including means for creating an alarm signal when a given ambient condition has been changed.

9. A portable device as defined in claim 8 further including:

(l) said alarm means including means for creating an alarm signal when a sound of a given intensity continues for a preselected time.

10. A portable device as defined in claim 9 further including:

(m) said alarm means including means for creating an alarm signal when a digitized representation of an ambient condition deviates from a preselected condition.

11. A portable device as defined in claim 8 and further including a microphone for receiving sound adjacent said device, said means for creating an answer signal upon recognizing the occurrence of an answer at said first remote telephone includes connecting said microphone to said telephone line and outputting said received sound thereon.

12. A device as defined in claim 8, and wherein said alarm means further include means for creating an alarm condition in said circuit when a digitized analog signal deviates from a preselected value.

13. A device as defined in claim 8 wherein said means for creating a first telephone format dialing signal includes means for causing said voice synthesizer to creat TOUCH TONE signals indicative of telephones to be called, means for amplifying said TOUCH TONE signals, and means for applying said TOUCH TONE signals to said telephone lines.

14. A device as defined in claim 8 and wherein said alarm means include means for creating said alarm signal in said device when a sound of a given intensity is detected by said microphone for at least a preselected time.

15. A device as defined in claim 8, and including a speaker on said device and a selector switch having at least first and second switch conditions, said first switch condition for connecting said sound synthesizer output to said speaker for sound output at said local area and said second switch condition for connecting said sound synthesizer output to said external telephone lines for output to said remote telephone on an answer signal therefrom.

16. The device as defined in claim 8 and wherein said telephone format dialing signal means include means for causing said sound synthesizer to apply a sound signal corresponding to TOUCH TONE Coded telephone numbers external to said telephone lines as said telephone format dialing signal.

17. The device as defined in claim 8 and including a power monitor circuit for detecting non-existence of A.C. current to the device, said circuit including a battery driven crystal oscillator having a preselected frequency output pulse, means for decreasing said frequency to a pulsing clock of a preselected clocking frequency, means for counting said clocking pulse toward a preselected value, means for creating a rate of control pulses by A.C. house current having a pulse rate controlled by house line frequency, means for creating an output signal when said value is reached before a control pulse, means for resetting said clock counting means, means for counting said output signals, said output signal counting means including means for creating detect signals after counting a selected number of output signals, means for resetting said preselected value to a number causing said output signal to occur at a rate matching said control pulse rate, and said detect signal comprising one of said plurality of preselected conditions.

18. A system for detecting the existence of a sound beyond a given level for a preselected period of time, and for alerting an external location of this detection, said system comprising a portable device with means for releasably connecting said device to existing telephone lines, a microphone for detecting sound within a local area, means for creating an alarm signal when the output of said microphone exceeds a preselected level for said preselected period of time, dialing means on said device for automatically dialing a series of telephone numbers by said device in response to said alarm signal, applying said numbers indicative of selected remote telephone locations onto said telephone lines, a sound synthesizer means on said device for applying a voice alarm message on said lines upon an answer from said dialed numbers indicative of the detection of sound beyond a given level, and means for terminating said dialing upon receipt of a call on said lines from one of said selected remote locations.

* * * * *